Patented Aug. 4, 1931

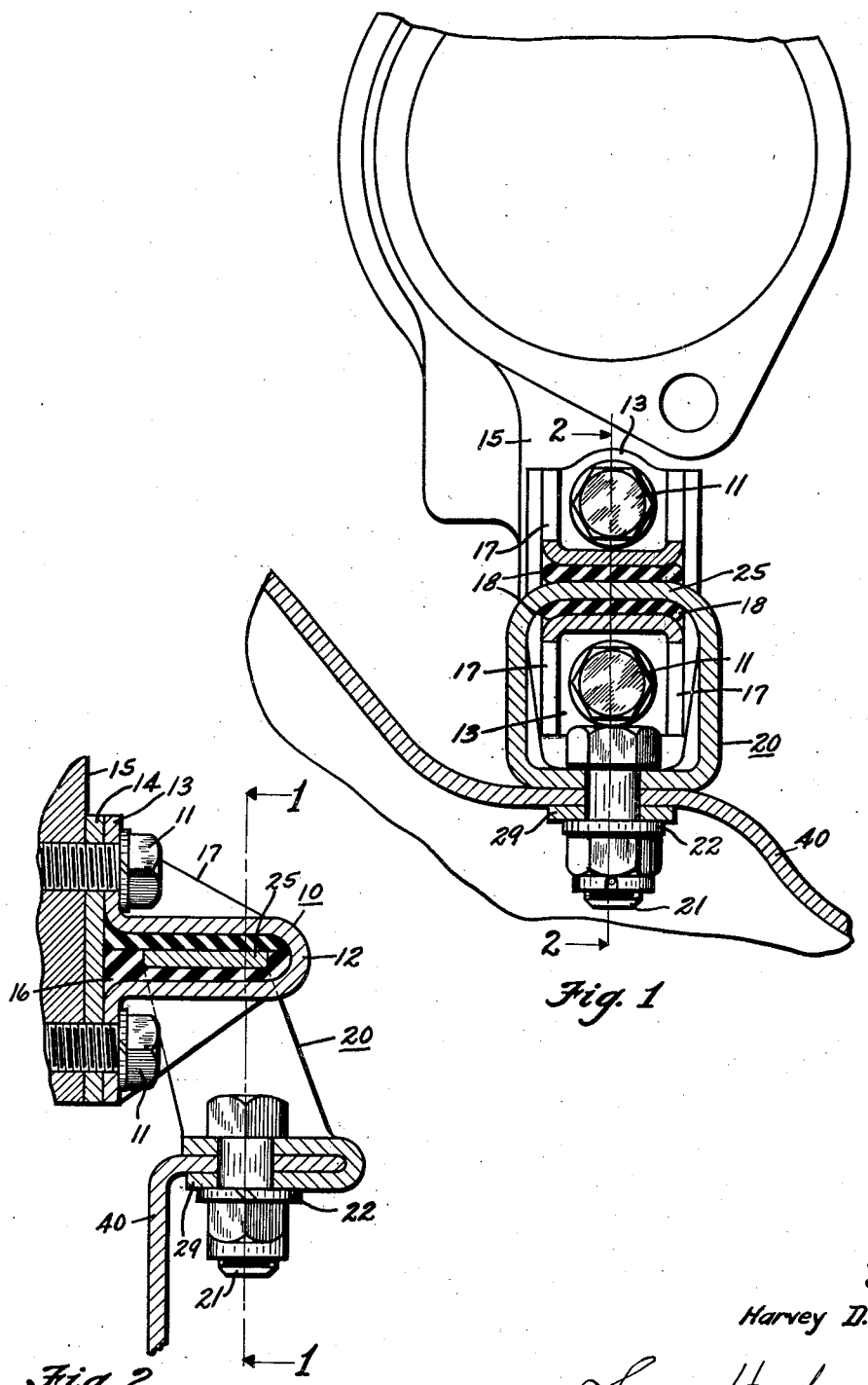

1,817,482

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

RESILIENT MOUNTING BRACKET

Application filed August 30, 1929. Serial No. 389,558.

This invention relates to metal-isolating slightly resilient mounting units adapted to be manufactured as a unit and readily assembled in place in the manner of an ordinary metal mounting fitting.

An object of the invention is to provide a very simple, efficient, and economically manufactured resilient mounting unit.

Another object is to provide such a resilient mounting unit which can be substituted for an ordinary metal angle bracket without any change being necessary in the location of the bolt holes in the parts to be connected. Also in many cases, adjacent interfering parts or lack of space necessitates that the attaching bolts be quite close together and substantially immediately adjacent the mounting unit. A feature of this invention is that the attaching bolts or screws for securing the unit to the parts connected thereby may be very close together and yet easy access thereto with an end wrench is provided. Hence this resilient mounting unit may be used in locations which are much too cramped for space to permit the use of other known designs of resilient connectors. The connector of this invention is especially adapted to be substituted for the small metal fitting now used on the present Chevrolet automobiles for mounting the engine upon the closely adjacent chassis frame member.

Further objects and advantages of the present invention will be apparent from the following description, reference being had to the accompanying drawings wherein a preferred embodiment of one form of the present invention is clearly shown.

In the drawings:

Fig. 1 shows a resilient mounting bracket unit of this invention assembled in place and connecting a portion of an automobile engine upon its supporting chassis frame member. The mounting unit is shown in section on line 1—1 of Fig. 2.

Fig. 2 is a vertical section taken on line 2—2 of Fig. 1.

Similar reference characters refer to similar parts throughout the several views.

Numeral 10 marks in its entirety the metal socket member which is rigidly fixed to the vertical surface 15 of a portion of the engine by means of the two bolts 11. Socket member 10 comprises a flattened U-shaped loop 12 having apertured projections 13 through which bolts 11 pass for attaching said member rigidly to the portion 15 of the engine. Preferably a flat plate 14 is interposed between the projections 13 and the surface 15 to provide a suitable closure for the otherwise open end of loop 12 and by means of which the non-metallic material 16 contained within loop 12 is compressed when bolts 11 are tightened. Socket member 10 preferably is formed from pressed steel plate and is provided with upper and lower strengthening gussets 17 on both sides of the loop 12. These gussets 17 provide suitable clearances for access to the bolt heads 11 with an end wrench.

Numeral 20 marks in its entirety the metal stirrup which is rigidly fixed to the chassis frame portion 40 by the bolt 21 and suitable lock washer 22. Stirrup 20 is preferably an endless ring member having a flat bearing portion 25 which passes through the loop 12 in spaced relation therewith and is completely isolated thereupon by a compressed resilient non-metallic material such as soft resilient rubber 16. This soft rubber 16 is preferably formed in divided portions, as clearly shown in Fig. 2, so that it may be easily assembled upon the bearing portion 25 prior to the insertion of the stirrup 20 into loop 12 and of course prior to the fixing of either stirrup 20 or socket member 10 to the parts 15 and 40. With the rubber 16 in place upon portion 25, the member 10 is slipped thereupon by the lower projecting portion 13 passing through the ring shaped stirrup 20 and the portion 25 passing laterally into loop 12 through the open end thereof. The rubber blocks 16 are of such size that they are compressed and flattened out by this assembling together of parts 10 and 20 and after loop 12 is completely filled the rubber blocks will project out somewhat beyond the outer surface of projections 13. Hence when the assembled mounting unit is fixed to the connected portion 15 by bolts 11 and plate 14 the rubber will be further compressed by the tightening of bolts 11. Due to this compression the rubber 16 spreads laterally and bulges outwardly at the unconfined edges at 18 (see Fig. 1). The rubber fibers at these bulges 18 are thus put under tension and this resists further bulging out of the resilient rubber when the weight of the engine or other applied load is put upon the mounting unit. Obviously the bearing portion 25 is resiliently held in place within loop 12 against motion in any direction, which is clear from Fig. 1 of the drawings.

It is thus seen that loop 12 and stirrup 20 form two interlocking metal loops with their axes extending substantially at right angles to one another and completely isolated from each other by resilient rubber or similar material. Together they form a compact mounting unit which can be easily assembled upon the parts connected thereby by the bolts 11 and 21. The ring shape of stirrup 20 provides an interior opening through which the lower bolt 11 may be passed and properly screwed in place by means of an end wrench. The lower bolt 21 may also be easily inserted in place from the interior of stirrup 20 as is obvious from Fig. 1. Preferably the stirrup 20 is made by bending up a flat strip of steel and welding the meeting ends thereof. The flat blank preferably has a projection thereon which is bent around to form the lower lip portion 29 which fits snugly around the horizontal flange of the frame member 40 and the bolt 21 passes through three thicknesses of metal giving a strong rigid construction.

The chief purpose of the invention is to provide a resilient metal-isolating simple fitting for mounting an automobile engine upon its chassis frame support in such manner that engine vibrations will not be transmitted to the chassis frame but will be partially damped out by the resilient material.

While the form of embodiment of the present invention as herein disclosed, constitutes a preferred form, it is to be understood that other forms might be adopted, all coming within the scope of the claims which follow.

What is claimed is as follows:

1. A metal-isolating mounting unit suitable for mounting a part upon a second part and preventing transmission of vibration therebetween, comprising: a horizontally disposed flat U-shaped bracket rigid with one of said parts, an endless one piece stirrup fixed to said other part and having a flat portion passing through said flat bracket, and resilient non-metallic material compressed under a considerable initial compression upon all sides of said flat portion and isolating said flat portion from said bracket member so as to absorb relative vibrations between said two parts in any direction.

2. A metal-isolating mounting unit suitable for mounting a part upon a second part and preventing transmission of vibrations therebetween, comprising: an offset bracket fixed to one of said parts by means of bolts and comprising a flat socket member, an endless stirrup fixed to said second part and having a flat portion passing through said flat socket, and resilient non-metallic material compressed between and isolating said bracket and flat portion, the interior of said stirrup providing access to one of said bolts with an end wrench.

3. A metal-isolating mounting unit suitable for mounting a part upon a second part and preventing transmission of vibrations therebetween, comprising; a flattened U-shaped bracket having apertured projections on opposite sides thereof, headed bolts passing through said apertured projections and serving to fix said bracket to one of said parts, a ring stirrup fixed to said second part and having a flat portion passing through said U-shaped bracket and resilient non-metallic material isolating said flat portion and bracket so as to absorb relative vibrations therebetween, said ring stirrup being substantially aligned with one of said bolts so as to provide access thereto with an end wrench.

In testimony whereof I hereto affix my signature.

HARVEY D. GEYER.